United States Patent
Uchiyama

(10) Patent No.: US 10,015,457 B2
(45) Date of Patent: Jul. 3, 2018

(54) PROJECTOR AND CONTROL METHOD WITH A STARTING REFERENCE POSITION IN A LOWER PART OF A TARGET IMAGE

(71) Applicant: SEIKO EPSON CORPORATION, Tokyo (JP)

(72) Inventor: Yoshiteru Uchiyama, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 24 days.

(21) Appl. No.: 14/339,858

(22) Filed: Jul. 24, 2014

(65) Prior Publication Data
US 2015/0035995 A1 Feb. 5, 2015

(30) Foreign Application Priority Data
Aug. 2, 2013 (JP) .................................. 2013-161081

(51) Int. Cl.
| H04N 9/31 | (2006.01) |
| G06F 3/01 | (2006.01) |
| H04N 17/00 | (2006.01) |

(52) U.S. Cl.
CPC ............ *H04N 9/3179* (2013.01); *G06F 3/01* (2013.01); *H04N 9/3182* (2013.01); *H04N 9/3185* (2013.01); *H04N 9/3188* (2013.01); *H04N 9/3191* (2013.01); *H04N 17/004* (2013.01)

(58) Field of Classification Search
CPC .. G06F 3/0425; G06F 3/0354; G06F 3/03542; G06F 3/0386; G06F 3/0418; H04N 9/3179; H04N 9/3182; H04N 9/3188; H04N 9/3191; H04N 9/3185
See application file for complete search history.

(56) References Cited

U.S. PATENT DOCUMENTS

| 7,852,316 B2* | 12/2010 | Ting | G06F 3/0386 345/157 |
| 7,956,842 B2* | 6/2011 | Ting | G06F 3/0386 345/156 |
| 2002/0089489 A1* | 7/2002 | Carpenter | G06F 3/0386 345/158 |
| 2006/0007134 A1* | 1/2006 | Ting | G06F 3/0386 345/156 |
| 2007/0290996 A1* | 12/2007 | Ting | G06F 3/0386 345/157 |

(Continued)

FOREIGN PATENT DOCUMENTS

| JP | 2012-027769 A | 2/2012 |
| JP | 2012027769 A * | 2/2012 |

(Continued)

*Primary Examiner* — Bao-Luan Le
(74) *Attorney, Agent, or Firm* — Oliff PLC

(57) ABSTRACT

A projector includes: a projection unit; a position detection unit; and a calibration control unit which causes the projection unit to project a target image at a reference position within a projection range of the projection unit, acquires an operation position for the indicating operation detected by the position detection unit during the projection of the target image, and carries out calibration processing. The target image is projected, starting at the reference position located in a lower part of the projection range, of plural reference positions within the projection range.

8 Claims, 6 Drawing Sheets

(56) References Cited

U.S. PATENT DOCUMENTS

| | | | |
|---|---|---|---|
| 2011/0025650 A1* | 2/2011 | Joscelyne | G06F 3/0418 |
| | | | 345/178 |
| 2012/0032926 A1 | 2/2012 | Douxchamps et al. | |
| 2012/0212415 A1* | 8/2012 | Yokobayashi | H04N 5/74 |
| | | | 345/158 |
| 2013/0328837 A1* | 12/2013 | Arizumi | G06F 1/1639 |
| | | | 345/179 |
| 2014/0049756 A1* | 2/2014 | Oka | G03B 21/147 |
| | | | 353/69 |
| 2014/0145948 A1* | 5/2014 | Hong | G06F 3/038 |
| | | | 345/158 |
| 2015/0215592 A1* | 7/2015 | Tone | H04N 9/3155 |
| | | | 348/744 |

FOREIGN PATENT DOCUMENTS

| | | |
|---|---|---|
| JP | A-2012-173447 | 9/2012 |
| WO | 2010122865 A1 | 10/2010 |

* cited by examiner

PROJECTOR AND CONTROL METHOD WITH A STARTING REFERENCE POSITION IN A LOWER PART OF A TARGET IMAGE

The entire disclosure of Japanese Patent Application No. 2013-161081, filed Aug. 2, 2013 is expressly incorporated by reference herein.

BACKGROUND

1. Technical Field

The present invention relates to a projector which projects and image, and a projector control method.

2. Related Art

According to the related art, a system is known which enables an operation to indicate a position, with a pen-type device or the like, on a projection surface where an image is projected by a projector (see, for example, JP-A-2012-173447). In the system of this type, calibration is needed in order to generate the correspondence between a position in a projection image and a position in an image based on an image signal. In typical calibration, an image that serves as a target is projected on the projection surface and an operator is made to carry out an indicating operation to the target image. Based on the position where the indication by the operator is detected and the position of the target image in the projection image, the correspondence between the position in the image projected on the projection surface and the position in the image based on the image signal can be generated.

However, there is a problem that, when carrying out calibration of a projector that projects a large projection image, the operator has to bear an increased burden in indicating a target image.

SUMMARY

An advantage of some aspects of the invention is to provide a projector that can reduce the burden of operation in calibration and a projector control method.

An aspect of the invention is directed to a projector including a projection unit which projects an image on a projection surface, an operation detection unit which detects an indicating operation to the projection surface, and a control unit which causes the projection unit to project a target image at a reference position within a projection range of the projection unit, acquires an operation position for the indicating operation detected by the operation detection unit during the projection of the target image, and carries out calibration processing. The control unit causes the target image to be projected, starting at the reference position located in a lower part of the projection range, of plural reference positions within the projection range.

According to this configuration, the target image is projected, starting at the bottom side within the projection range. In most cases, the operator can easily carry out the indicating operation on the bottom side of the projection range. Therefore, by projecting the target image first at the position where the operator can easily carry out the indicating operation, it is possible to reduce the burden of operation.

In the projector according to the aspect described above, the control unit may execute a position acquisition process in which the target image is projected at the reference position so as to acquire the operation position, and a calibration process in which calibration is executed, based on the operation position acquired in the position acquisition process. In the position acquisition process, if suspension of processing is indicated after the operation position is acquired with respect to a part of the plural reference positions, the position acquisition process may be ended and the calibration process may be carried out.

According to this configuration, processing can be suspended to execute the calibration, at the point when the target image is projected and the indicating operation is carried out with respect to a part of the plural reference positions in the projection range. Therefore, the target image is projected, starting at the reference position in the lower part of the projection range, and at the point when the indicating operation is carried out only at the reference position within the range that can be operated by the operator, processing can be suspended to execute the calibration. Thus, since the calibration can be carried out even if the operator does not carry out the indicating operation to the upper part of the projection range, the burden of operation can be reduced further.

In the projector according to the aspect described above, the control unit may acquire the operation position with respect to the plural reference positions that are preset within the projection range and may subsequently execute the calibration process, if suspension of processing is not indicated during the position acquisition process.

According to this configuration, if suspension of processing is not indicated, the operation position is acquired with respect to all the reference positions that are set in the projection range and calibration is then carried out. Therefore, more appropriate calibration can be carried out, based on the many reference positions and operation positions. Also, if the reference position is set over the entire projection range, the calibration can be carried out to the entire projection range. When the indicating operation is carried out to the projection surface, the operation position can be detected accurately.

In the projector according to the aspect described above, the control unit may detect an indication of suspension of processing if the indicating operation detected by the operation detection unit during the position acquisition process is an operation that meets a preset condition.

According to this configuration, by carrying out the indicating operation in a way that meets the preset condition, the operator can thus indicate suspension of processing, using an operation measure that is similar to the indicating operation. For example, when carrying out the indicating operation for calibration by using a position indicating device or a finger, the operator can move this device or a finger in a way that meets the preset condition to indicate suspension of processing. Therefore, since the operator can indicate suspension of processing without shifting the device for the operation from one hand to the other or operating a switch or the like at a remote position, the burden of operation in executing the calibration can be reduced further.

The projector according to the aspect described above may further include an input unit. The control unit may end the position acquisition process and execute the calibration process, if an indication of suspension of processing is inputted by the input unit during the position acquisition process.

According to this configuration, the operator can indicate suspension of processing by operating the input unit. In the projector, since the indication of suspension of processing can be detected securely and quickly, the calibration can be executed efficiently and quickly.

In the projector according to the aspect described above, the control unit may cause the target image to be projected sequentially from bottom to top with respect to the plural reference positions arranged in advance in the projection range.

According to this configuration, since the target image is projected sequentially from bottom to top within the projection range, the position where the operator carries out an operation moves from bottom toward top. Therefore, the operator can easily carryout the indicating operation. Also, if processing is to be suspended before the target image is projected at all the reference positions, the indicating operation can be carried out at many reference positions because the target image is projected sequentially from the reference position where the operation is easy. Therefore, more appropriate calibration can be carried out.

In the projector according to the aspect described above, a predetermined area including a lower part of the projection range may be set. The control unit may cause the target image to be projected at the reference position within the predetermined area, acquire the operation position, and subsequently cause the target image to be projected at the reference position outside the predetermined area.

According to this configuration, the target image can be projected, starting at the reference position where operation is easy, in the projection range, and the projection order of the target image at the reference position within the predetermined area can be arbitrarily changed. Therefore, the target image can be projected in the order suitable for the calibration processing after the operation in calibration is made easier.

Another aspect of the invention is directed to a projector control method including: controlling a projector which projects an image on a projection surface; projecting a target image at a reference position within a projection range on the projection surface, detecting an indicating operation to the projection surface during the projection of the target image, acquiring an operation position for the detected indicating operation, and carrying out calibration processing; and projecting the target image, starting at the reference position located in a lower part of the projection range, of plural reference positions within the projection range.

According to this configuration, the target image is projected, starting at the bottom side within the projection range, and calibration is carried out there. In most cases, the operator can easily carry out the indicating operation on the bottom side of the projection range. Therefore, by projecting the target image first at the position where the operator can easily carry out the indicating operation, it is possible to reduce the burden of operation.

According to the above configurations, it is possible to reduce the burden of operation by projecting the target image first at the position where the operator can easily carry out the indicating operation.

BRIEF DESCRIPTION OF THE DRAWINGS

The invention will be described with reference to the accompanying drawings, wherein like numbers reference like elements.

FIG. 3A shows an example of a display mode and a display order of a target image. FIG. 3B shows an example in the case where the display of the target image is suspended.

FIG. 4A shows a display mode and a display order of a target image in a lower part of a projection range. FIG. 4B shows a display mode and a display order of a target image in an upper part of the projection range.

DESCRIPTION OF EXEMPLARY EMBODIMENTS

Hereinafter, an embodiment of the invention will be described with reference to the drawings.

Figure 1:
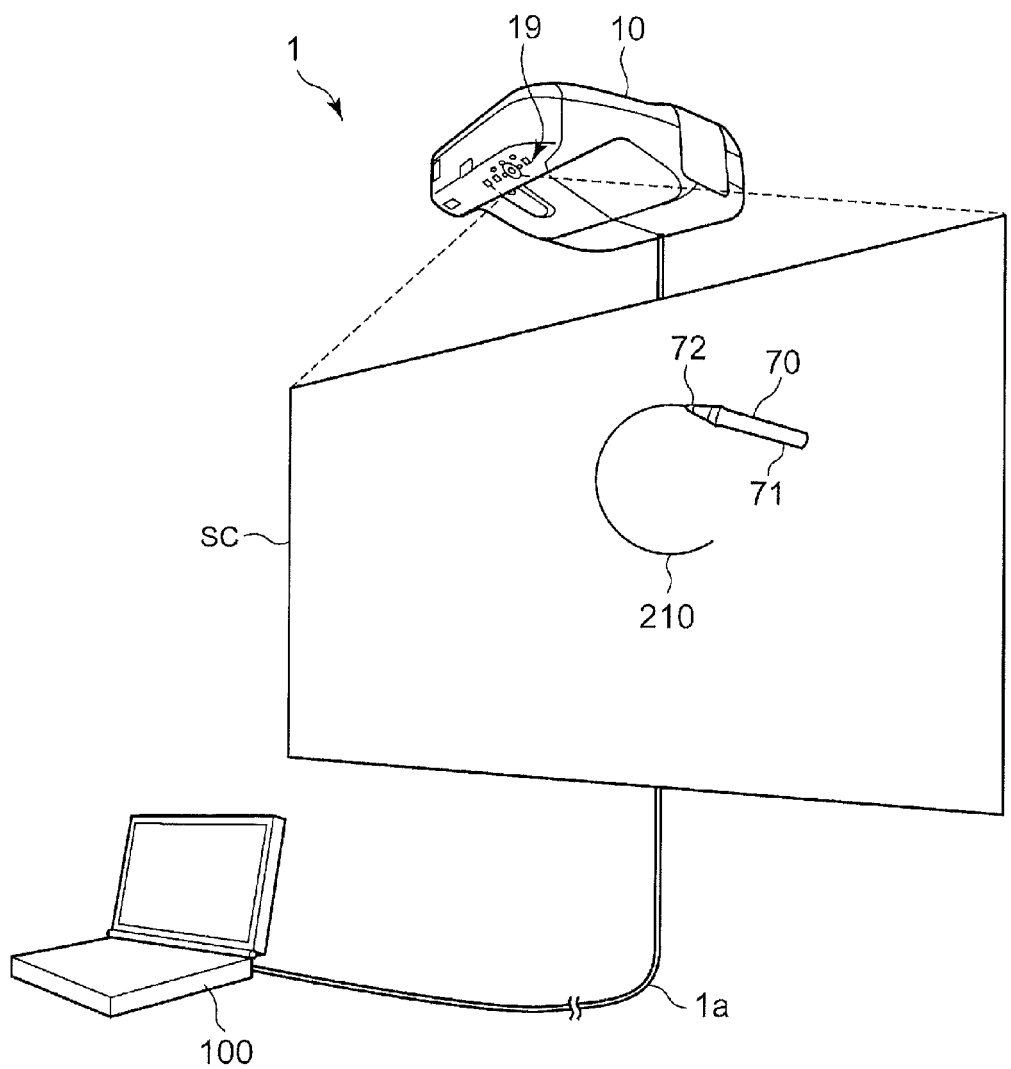
FIG. 1 shows the configuration of a projection system according to an embodiment of the invention.

FIG. 1 shows the configuration of a projection system 1 according to an embodiment of the invention. The projection system 1 is configured by connecting a PC (personal computer) 100 to a projector 10 as an image display device installed above a screen SC.

The PC 100 transmits image data, as an image output device. The projector 10 receives the image data transmitted from the PC 100 and projects an image based on the image data onto the screen SC as a projection surface. The projector 10 can project an image whether the received image data from the PC 100 is still image data or dynamic image (video) data. The projector 10 may also project on the screen SC an image based on image data stored inside the projector 10, or an image generated inside the projector 10 as described later.

The projector 10 is installed directly above the screen SC and projects an image obliquely downward. Therefore, the projector 10 may preferably be a short-focus type. The screen SC illustrated in this embodiment is a flat plate or curtain fixed to a wall surface or provided upright on a floor surface. The invention is not limited to this example and a wall surface can be used as the screen SC. In such a case, the projector 10 may be installed in an upper part of the wall surface that is used as the screen SC.

In the projection system 1, an operation can be carried out with an indicator 70 on the screen SC on which the projector 10 projects an image. The indicator 70 is, for example, a pen-type input device which the operator uses by holding a shaft portion 71 thereof by hand and pressing the distal end thereof onto the screen SC. An operation switch 72 which detects a pressing operation is provided at the distal end of the indicator 70. When the operator presses the distal end of the indicator 70 onto the screen SC, the operation switch 72 turns on. The operator presses the distal end of the indicator 70 at an arbitrary position on the screen SC, thereby carrying out a position indicating operation (indicating operation).

The projector 10 has the function of detecting the position of the indicator 70 on the screen SC, as described below. When the operator carries out the position indicating operation, the projector 10 detects the position where the distal end of the indicator 70 contacts the screen SC, as an operation position.

The projection system 1 functions as an interactive whiteboard system which accepts the position indicating operation carried out by the operator with the indicator 70 and reflects this operation on a projection image. Specifically, the projection system 1 draws an image of a graphic pattern such as a straight line, curved line or polygon, or a letter or the like according to the operation position of the position indicating operation, and projects the drawn image on the screen SC. The projection system 1 may draw an image in a way that overlaps a certain projection image that is projected on the screen SC, or may draw an image in the state where no other images are projected. The image drawn by this function may be saved as image data. In such a case, it is possible to save the drawn image alone as image data or to save one image in which the projection image projected on the screen SC at the time of drawing and the drawn image overlap with each other, as image data.

Figure 2:
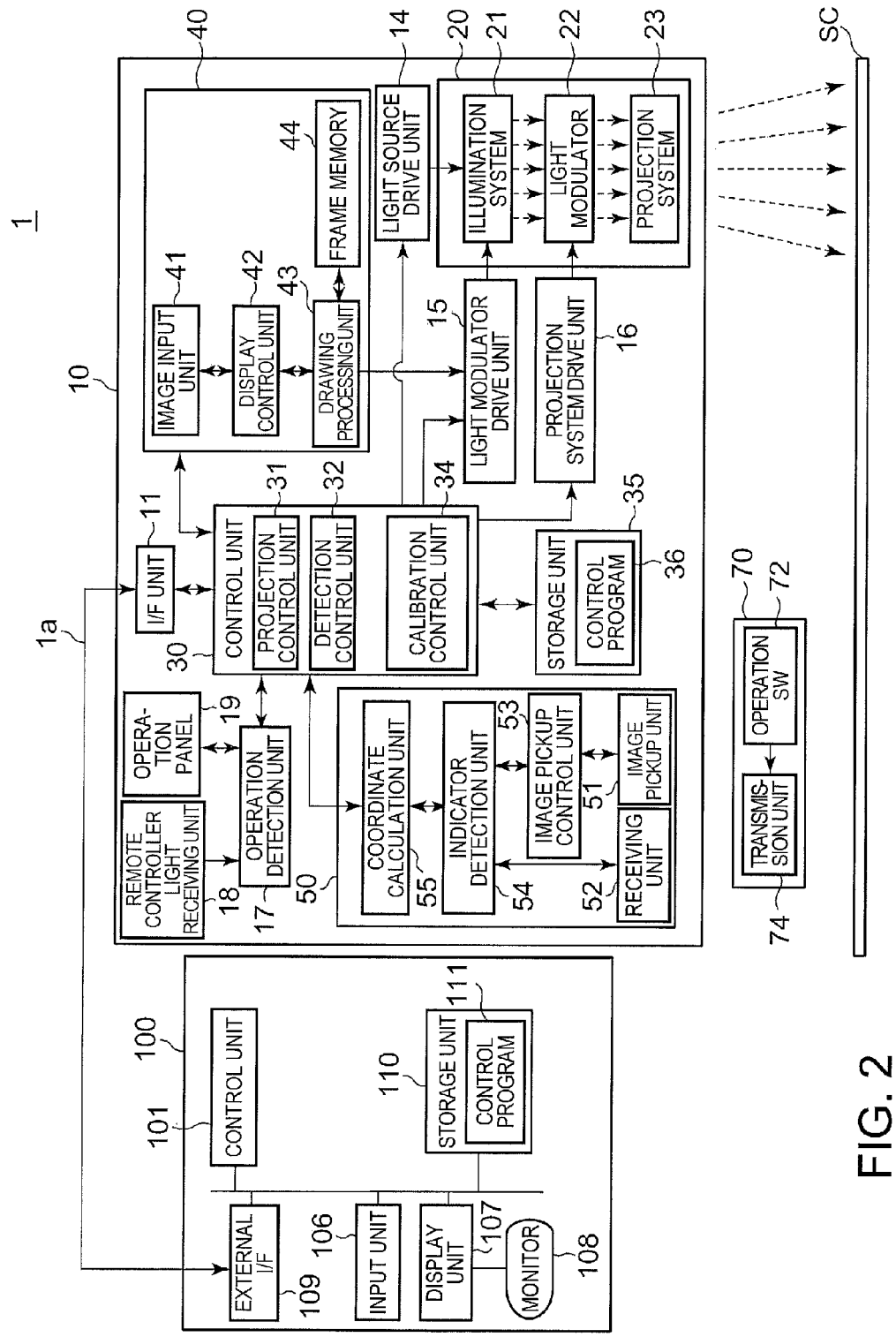
FIG. 2 is a functional block diagram of each section that forms the projection system.

FIG. 2 is a functional block diagram of each section that forms the projection system 1.

The projector 10 has an I/F (interface) unit 11 which is connected to an external device such as the PC 100 and a video playback device, DVD playback device or the like. The I/F unit 11 may include, for example, a USB interface or a communication interface such as wired or wireless LAN interface. In this embodiment, the PC 100 is connected to the LAN interface or USB interface provided in the I/F unit 11.

The I/F unit 11 may also have an image input terminal to which analog video signals and video image data are inputted. The image input terminal is a VGA terminal, DVI (digital visual interface), S video terminal, RCA terminal, D terminal, HDMI connector conforming to the HDMI (trademark registered) standard, or the like. The I/F unit 11 may include an interface circuit and an image processing circuit that correspond to these image input terminals.

Roughly, the projector 10 has a projection unit 20 which forms an optical image, and an image processing system which processes image data. The projection unit 20 has an illumination system 21, a light modulator 22, and a projection system 23. The illumination system 21 includes a light source made up of a xenon lamp, an ultra-high pressure mercury lamp, an LED (light emitting diode), a laser light source or the like. The illumination system 21 may also include a reflector and an auxiliary reflector that guide the light emitted from the light source to the light modulator 22. The illumination system 21 may further include a lens group (not shown) to enhance optical characteristics of the projected light, a polarizer, or a dimming element or the like which reduces the amount of light of the light emitted from the light source, on the path to the light modulator 22.

The light modulator 22 has, for example, three transmission-type liquid crystal panels corresponding to the primary colors of RGB. The light modulator 22 modulates light transmitted through the liquid crystal panels, thus generating an image light. The light from the illumination system 21 is separated into color lights of the three colors RGB. Each color light becomes incident on each corresponding liquid crystal panel. The color lights transmitted and modulated through the respective liquid crystal panels are combined by a light combining system such as cross dichroic prism and then emitted to the projection system 23.

The projection system 23 has a zoom lens which enlarges and reduces an image to be projected and adjusts the focus thereof, a zoom adjustment motor which adjusts the degree of zooming, a focus adjustment motor which adjusts the focusing, a concave mirror which reflects projected light toward the screen SC, and the like. The projection system 23 carries out zoom adjustment and focus adjustment of the image light modulated by the light modulator 22, then guides the light passing through a lens group into the direction of the screen SC via the concave mirror, and causes the light to form an image on the screen SC. A projection system drive unit 16 which drives each motor provided in the projection system 23 under the control of a control unit 30, and a light source drive unit 14 which drives the light source provided in the illumination system 21 under the control of the control unit 30 are connected to the projection unit 20. It should be noted that the specific configuration of the projection system 23 is not limited the above example. For example, a configuration without mirrors including a concave mirror may be employed to project the light modulated by the light modulator 22 onto the screen SC via a lens and cause the light to form an image there.

Meanwhile, the image processing system includes a storage unit 35, an operation detection unit 17, an image processing unit 40, and a light modulator drive unit 15, as well as the control unit 30 controlling the entire projector 10, as a main component. The storage unit 35 stores a control program 36 to be executed by the control unit 30 and data to be processed by the control unit 30. The image processing unit 40 processes an input image inputted via the I/F unit 11. The light modulator drive unit 15 drives the light modulator 22 to draw an image, based on an image signal processed by the image processing unit 40.

The operation detection unit 17 is connected to a remote controller light receiving unit 18 and an operation panel 19 and detects operations carried out via the remote controller light receiving unit 18 and the operation panel 19.

The remote controller light receiving unit 18 receives an infrared signal transmitted according to a button operation from a remote controller (not shown) used by the operator of the projector 10. The remote controller light receiving unit 18 decodes the infrared signal received from the remote controller, thus generates operation data indicating the operation content on the remote controller, and outputs the operation data to the control unit 30.

The operation panel 19 is provided on the outer casing of the projector 10 and has various switches and an indicator lamp. The operation detection unit 17, under the control of the control unit 30, causes the indicator lamp on the operation panel 19 to turn on and off properly according to the operating state and setting state of the projector 10. When a switch on the operation panel 19 is operated, operation data corresponding to the operated switch is outputted from the operation detection unit 17 to the control unit 30.

Here, the remote controller and the operation panel 19 function as input units.

The control unit 30 outputs the image data inputted from the I/F unit 11 to the image processing unit 40. The image processing unit 40 includes an image input unit 41, a display control unit 42, a drawing processing unit 43, and a frame memory 44. The image input unit 41 buffers inputted image data. The display control unit 42 properly executes various kinds of conversion processing such as interlace/progressive conversion, resolution conversion or color conversion, on the image data inputted to the image input 41, and thus generates image data of a preset format. The drawing processing unit 43 develops an image of each frame into the frame memory 44, based on the image data processed by the display control unit 42. The image data developed in the frame memory 44 is outputted to the light modulator drive unit 15. The drawing processing unit 43 may also perform trapezoidal distortion correction and pincushion distortion correction on the image data developed in the frame memory 44. In such a case, the drawing processing unit 43 deforms the image data developed in the frame memory 44, for example, into an inverted trapezoid that compensates for a trapezoidal distortion. Moreover, in the operation mode in which the projector 10 carries out drawing, the drawing processing unit 43 carries out editing to add or delete an image of a graphic pattern or the like to or from the image developed in the frame memory 44 according to the coordinates of the operation position of the indicator 70, thereby generating an image or updating the image. Thus, an image corresponding to the operation of the indicator 70 is drawn and projected on the screen SC.

The indicator 70 has a transmission unit 74 which outputs an infrared signal, in addition to the operation switch 72. The transmission unit 74 has, for example, a light emitting unit such as infrared LED, a light emission control circuit, and a power supply or the like. The transmission unit 74 periodically transmits an infrared signal in the state where the power supply of the indicator 70 is on. The transmission unit 74 modulates an infrared signal according to the operating state (on/off) of the operation switch 72 and transmits data indicating the on/off state of the operation switch 72, for example, by a format conforming to the IrDA standard.

The projector 10 has a position detection unit 50 which detects the operation by the indicator 70. The position detection unit 50 includes an image pickup unit 51, a receiving unit 52, an image pickup control unit 53, an indicator detection unit 54, and a coordinate calculation unit 55. The position detection unit 50 functions as an operation detection unit.

The image pickup unit 51 has an image pickup optical system, an image pickup element, an interface circuit and the like, and picks up an image in the projecting direction of the projection system 23. The image pickup optical system of the image pickup unit 51 is arranged facing the same direction as the projection system 23 and has an angle of view that covers the range where the projection system 23 projects an image on the screen SC. The image pickup element may be a CCD or CMOS. The interface circuit reads and outputs a detection value from the image pickup element.

The image pickup control unit 53 causes the image pickup unit 51 to execute image pickup and thus generates pickup image data. As the image pickup unit 51 executes image pickup under the control of the image pickup control unit 53, the indicator 70 being operated on or near the screen SC is picked up together with the image projected on the screen SC. The image pickup element of the image pickup unit 51 may have sensitivity to the wavelength range of visible rays. However, in this embodiment, the image pickup unit 51 has sensitivity to the wavelength range of infrared rays or infrared and visible rays. The image pickup unit 51 outputs pickup image data of infrared rays condensed by the image pickup optical system.

The receiving unit 52 receives and decodes the infrared signal transmitted from the transmission unit 74 and outputs the received data. The received data outputted from the receiving unit 52 includes data indicating the operating state of the operation switch 72.

The indicator detection unit 54 detects the position of the indicator 70, based on the pickup image data generated by the image pickup control unit 53. The indicator detection unit 54 executes processing to detect a shape similar to the indicator 70 in the pickup image data and to slice out an image of the indicator 70, and specifies the position of the indicator 70 in the pickup image data. Here, the indicator detection unit 54 may specify the direction which the distal end of the indicator 70 faces. Also, the indicator detection unit 54 detects the operating sate of the operation switch 72, based on the received data outputted from the receiving unit 52.

The coordinate calculation unit 55 calculates the coordinates of the position which the distal end of the indicator 70 indicates on the screen SC, that is, the coordinates of the operation position, based on the position of the indicator 70 in the pickup image data specified by the indicator detection unit 54. Specifically, the coordinate calculation unit 55 calculates the coordinates with reference to the area (projection range) where the projection unit 20 projects a projection image on the screen SC, based on the operation position in the pickup image data. The coordinate calculation unit 55 outputs data representing the calculated coordinates of the operation position and the operating state of the operation switch 72 or the like, to the control unit 30. The coordinate calculation unit 55 may also output the pickup image data picked up by the image pickup unit 51, to the control unit 30.

The control unit 30 reads and executes the control program 36 stored in the storage unit 35, thereby realizing the functions of a projection control unit 31, a detection control unit 32, and a calibration control unit 34 (control unit). The control unit 30 thus controls each section of the projector 10.

The projection control unit 31 acquires the content of an operation carried out by the operator, based on the operation data inputted from the operation detection unit 17. The projection control unit 31 controls the image processing unit 40, the light modulator drive unit 15, the projection system drive unit 16 and the light source drive unit 14 according to the operation carried out by the operator, and causes an image to be projected on the screen SC. The projection control unit 31 also controls the projection system drive unit 16 to cause the projection system 23 to execute focus adjustment, zoom adjustment, aperture adjustment and the like.

The detection control unit 32 controls the position detection unit 50 to execute detection of the operation position of the indicator 70 and detects the coordinates of the operation position and the operating state of the operation switch 72.

The calibration control unit 34 controls the projection control unit 31 and the detection control unit 32 to carry out calibration processing. The calibration processing includes a position acquisition process and a calibration process. First, the calibration control unit 34, in the position acquisition process, causes the projection control unit 31 to project a target image for calibration on the screen SC and acquires the coordinates of the operation position detected by the detection control unit 32 during the projection of the target image. The target image is an image that prompts the operator to carry out the position indicating operation and that indicates the position to be operated. In the example below, the target image is denoted by a symbol "◯" and the operator carries out the position indicating operation to indicate the center of the "◯" projected on the screen SC, using the indicator 70.

After that, the calibration control unit 34 executes the calibration process and generates the correspondence between the position on the projection image and the detected position detected by the position detection unit 50, based on the position in the projection range of the projection unit 20, that is, in the entire projection image, and the acquired coordinates of the operation position. The target image is arranged at a position that is preset in the projection image developed in the frame memory 44. The coordinates of the operation position detected by the position detection unit 50 are the coordinates in the projection image projected on the screen SC. As the operator carries out the operation according to the target image on the screen SC, the position of the target image and the operation position detected by the position detection unit 50 coincide with each other. The calibration control unit 34 generates the correspondence between the position of the target image and the operation position, and based on this correspondence, generates the correspondence between the position on the projection image and the detected coordinates of the operation position.

Thus, the control unit 30 can specify which position in the entire projection image is the position operated by the indicator 70.

The PC 100 has a control unit 101 which centrally controls each part of the PC 100. The control unit 101 is realized by a CPU, a ROM which stores a basic control program or the like executed by the CPU, a RAM which temporarily stores programs executed by the CPU and data or the like processed by the CPU, and the like. The PC 100 also has an input unit 106, a display unit 107, an external I/F (interface) 109, and a storage unit 110. The input unit 106 detects input operations by input devices including a keyboard and a pointing device such as mouse. The display unit 107 displays the content of the input operation detected by the input unit 106 and the result of processing by the control unit 101, on a monitor 108. The external I/F 109 is connected to the I/F unit 11 provided in the projector 10 via a cable 1a. The storage unit 110 stores various programs including a control program 111 executed by the control unit 101, data processed by these programs, and the like in a non-volatile manner.

The control unit 101 executes the control program 111, thereby executing processing to control the projector 10 and processing to receive data transmitted from the projector 10, and the like. When outputting image data to the projector 10, the control unit 101 selects image data to be outputted according to the operation detected by the input unit 106. For example, the control unit 101 selects image data that is designated directly by an operator's operation, from image data (not shown) stored in the storage unit 110. At this point, the control unit 101 may select image data in the storage unit 110 in a preset order. The control unit 101 outputs the selected image data to the projector 10. At this point, the control unit 101 may carry out processing to convert the resolution and frame rate of the selected image data according to the specifications of the projector 10.

Meanwhile, when receiving data that indicates the operation position of the indicator 70 detected by the position detection unit 50 of the projector 10, from the projector 10, the control unit 101 may generate an image based on the received data and output the image to the projector 10. That is, the control unit 101 may carry out the drawing processing to be carried out by the drawing processing unit 43 of the projector 10.

Figure 3A:
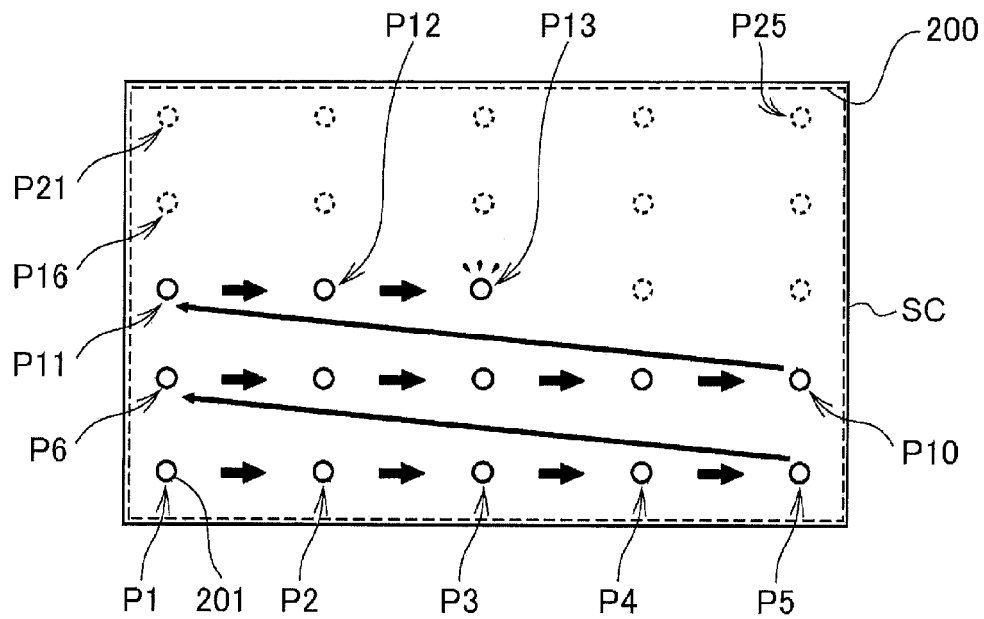
FIGS. 3A and 3B show an example of a projection image in calibration processing.
Figure 3B:
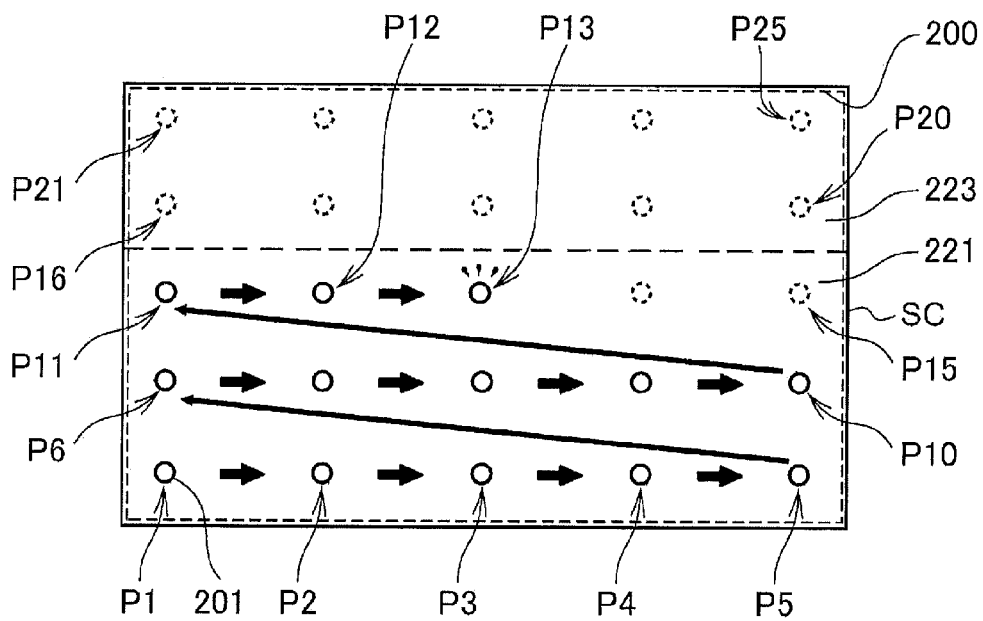

FIGS. 3A and 3B show an example of a target image projected in calibration processing by the calibration control unit 34. FIG. 3A shows an example of the display mode and display order of a target image. FIG. 3B shows an example in the case where the display of the target image is suspended.

In FIGS. 3A and 3B, a projection range 200 is indicated by dashed lines. This projection range 200 is a range in which the projection unit 20 can project an image, and this range is rectangular as a trapezoidal distortion correction is made thereto. An image projected on the screen SC by the projector 10 is formed across the entire projection range 200 or within the projection range 200 and does not fall out of the projection range 200. FIGS. 3A and 3B are front views of the screen SC, where the up, down, left and right directions in the figures correspond to the up, down, left and right directions on the screen SC.

The calibration control unit 34 causes a target image to be displayed on the screen SC, in the position acquisition process of the calibration processing. The image data of the target image is stored in the storage unit 35. The calibration control unit 34 causes the image processing unit 40 to process the image data read out from the storage unit 35 and causes the projection unit 20 to project the image. Here, the data of the target image stored in the storage unit 35 may be an image covering the entire projection range for one frame processed by the image processing unit 40. Alternatively, the data may include data of a symbol or image to be the target image, and data designating the position of the data of this symbol or image. In the description below, an example will be described in which the reference position in the projection range is preset with the dot position in the frame memory 44 or the coordinates within the projection range and the calibration control unit 34 arranges and causes the target image to be projected (displayed) at the coordinates of the reference position.

In the example shown in FIG. 3A, twenty-five reference positions P1 to P25 are set in the projection range 200. The calibration control unit 34 uses the function of the projection control unit 31 to display a target image 201 at the reference positions P1 to P25. As the target image 201, various symbols and images may be used as described above. However, a circular symbol is used in this embodiment.

The calibration control unit 34 causes the target image 201 to be displayed, starting at the reference position situated on the bottom side, of the reference positions P1 to P25 arranged in the projection range 200. In the example of FIG. 3A, the target image 201 is displayed first at the reference positions P1 to P5 situated at the bottom, of the reference positions P1 to P25. Of the reference positions p1 to P5, the target image 201 is displayed first at the reference position P1 on the left end. After that, the target image 201 is displayed in the order of the reference positions P2, P3, P4 and P5 to the right. While the order in the left-right direction is not particularly limited in FIG. 3A, it is desirable that the order should be of less burden on the operator because the display order of the reference positions decides the direction in which the position to be operated by the operator with the indicator 70 moves. Following the reference positions P1 to P5, the target image 201 is displayed at the reference positions P6 to P10 on the second stage from the bottom. Subsequently, the target image 201 is displayed at the reference positions in the order of P11 to P15, P16 to P20, and P21 to P25. In this manner, the target image 201 indicating the position to be operated with the indicator 70 is displayed from the bottom to the top of the projection range 200. The operator carries out an operation with the indicator 70, overlapping with the target images 201 displayed sequentially from the bottom to the top of the projection range 200.

In the position acquisition process, after displaying one or plural target images 201 in the projection range 200, the calibration control unit 34 waits for an operation to touch the indicator 70, overlapping with all of the displayed target images 201. Then, after the operation with the indicator 70 is carried out on the displayed target images 201, a target image 201 is displayed at the next one or plural reference positions. In the example of FIG. 3A, the target images 201 are displayed one by one, and the target images 201 on which the operation with the indicator 70 is carried out are continuously displayed while the target image 201 on which the operation with the indicator 70 is not carried out is blinkingly displayed. The reference positions at which the target image 201 is not yet displayed are indicated by dashed lines. Nothing is displayed on the screen SC, corresponding to these reference positions.

After the operation with the indicator 70 is carried out at all of the reference positions P1 to P25, the calibration control unit 34 ends the position acquisition process. Next, the calibration control unit 34 executes the calibration process. In the calibration process, calibration is carried out in the entire projection range 200, based on the positions of the projection image data at the reference positions P1 to P25 and the operation position of the indicator 70. Thus, in the entire projection range 200, the correspondence between the coordinates in the projection image data and the coordinates in the projection range 200 projected on the screen SC is generated. After that, as the indicator 70 operates on the screen SC, the coordinates in the projection image data corresponding to this operation position can be calculated.

Moreover, the calibration control unit 34 can end the position acquisition process and shift to the calibration process, at the point when the operation with the indicator 70 is carried out only with respect to a part of the reference positions P1 to P25 arranged in the projection range 200. If suspension of calibration is indicated by the operation with the indicator 70 or the operation on a remote controller (not shown) or the operation panel 19 when the target image 201 is displayed at the reference position P13, as shown in FIG. 3B, the position acquisition process ends. Here, the calibration control unit 34 has already acquired the operation position of the indicator 70 with respect to the reference positions P1 to P12. Therefore, the calibration control unit 34 executes the calibration process to perform calibration in an area 221 including the reference positions P1 to P12, of the projection range 200. The area 221 is, for example, an area including reference positions for which the operation position of the indicator 70 is already acquired in the direction of the height of the projection range 200. In the example of FIG. 3B, the area 221 is rectangular so that the efficiency of arithmetic processing for calibration is improved. Since the shape of the area 221 is not limited to rectangular, the area may be marked off between the reference position P12 and the reference position P13. That is, the area 221 may be any shape that is smaller than the entire projection range 200 and that includes reference positions for which the operation position of the indicator 70 is already acquired.

In this case, for the area 221, arithmetic processing for calibration is carried out as in the case where the operation position is acquired at all the reference positions in the projection range 200. The calibration control unit 34 also carries out calibration with respect to the section outside the area 221 in the projection range 200 (area 223). This processing can be called simple calibration. Since there is no correspondence between reference position and operation position in the area 223, the operation position or the like in the area 221 is utilized. For example, an area in the area 221 that has the same area size as the area 223 can be sliced out and the correspondence between the coordinates in the projection image data in the area that is sliced out and the coordinates in the projection range 200 on the screen SC can be applied to the area 223. Also, for example the operation positions corresponding to the reference positions P16 to P25 in the area 223 may be calculated from the operation positions corresponding to the reference positions P1 to P15 or the reference positions P1 to P10 in the area 221. The calculated operation position is a pseudo operation position but can be used for calibration similarly to the actual operation position. In this manner, calibration can be carried out using a pseudo operation position (which can also be referred to as an estimate value of the operation position) with respect to the reference positions P16 to P25 that are not actually operated. In this case, high efficiency is realized as similar arithmetic method to the calibration in the area 221 and the entire projection range 200 can be used.

In this manner, the calibration control unit 34 causes the target image 201 to be displayed, starting at the bottom side of the projection range 200, and then demands the operator's operation. Therefore, for example, even if the projection range 200 is large-sized, an operation can be carried out from the bottom side, where the operation is easier, thus reducing the burden on the operator. Also, situations where the calibration operation cannot be carried out at all can be avoided. For example, if the upper end of the projection range 200 is situated far away from the floor surface, the operation may not be carried out even when the target image 201 is displayed at a reference position situated at the top. In this case, since the first target image 201 to be displayed cannot be operated, calibration cannot be carried out at all. In the example of this embodiment, as the target image 201 is displayed, starting at the bottom side of the projection range 200, where the inability to operate is most unlikely, at least a part of the reference positions can be operated securely. Then, when the operation with the indicator 70 is not carried out with respect to all of the reference positions in the projection range 200 but is carried out with respect to apart of the reference positions, the calibration control unit 34 can execute the calibration process based on this operation. Therefore, there is an advantage that calibration can be carried out even if the operator cannot operate at a part of the projection range 200.

When the remote controller (not shown) or the operation panel 19 is used, a switch or button that is set in advance to correspond to an indication of suspension of the calibration processing may be operated, as a method for inputting an indication of suspension of the calibration processing. In this case, as the operation detection unit 17 outputs the operation of the switch or button in question to the control unit 30, the calibration control unit 34 detects that suspension of the calibration processing is indicated.

Also, suspension of the calibration processing can be indicated by operating the indicator 70. If the operation with the indicator 70 detected by the position detection unit is an operation that meets a preset condition, the calibration control unit 34 detects that suspension of the calibration processing is indicated. The preset condition may be the operation position detected by the position detection unit 50, the trajectory of the operation position, the operating state of the operation switch 72 or the like. The case where the operation meets the condition may be, for example, the case where the trajectory of the operation position forms a predetermined shape, the case where the position indicating operation is carried out plural times consecutively at substantially the same position, the case where the operation switch 72 is turned on/off in a predetermined pattern, or the like. The state where this operation position is away from the target image 201 that is not operated by a predetermined distance or longer, may also be included in the condition. That is, an operation in a mode that can be clearly distinguished from the position indicating operation with respect to the target image 201 displayed by the calibration control unit 34 may be employed. In this case, the operator can indicate suspension of the calibration processing easily and quickly, without having to replace the indicator 70 with another device (remote controller or the like) or move in order to operate the operation panel 19.

The order in which the calibration control unit 34 displays the target image 201 at the reference positions P1 to P25 is not limited to the example in which the target image is displayed by each stage from bottom to top, as shown in FIGS. 3A and 3B.

Figure 4A:
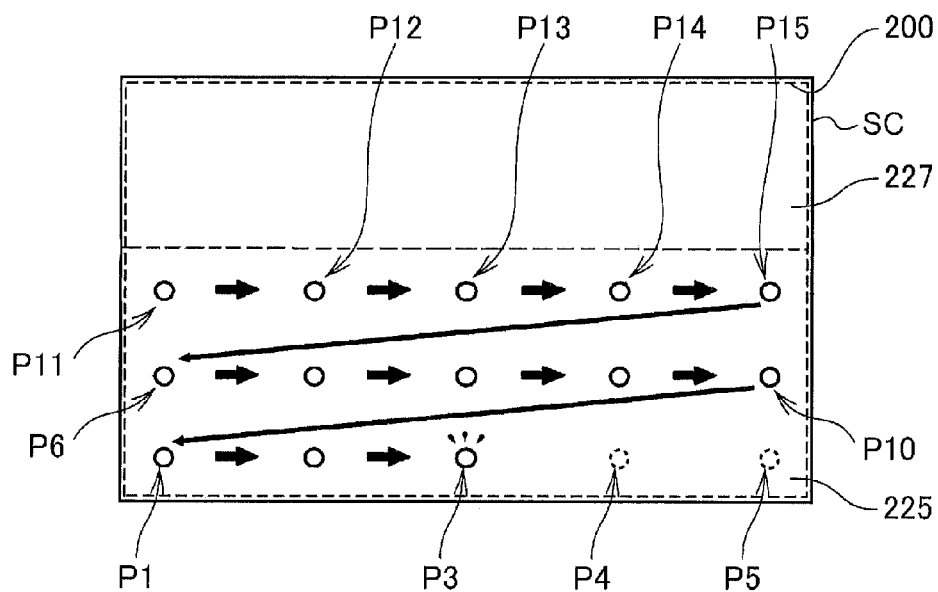
FIGS. 4A and 4B show another example of a projection image in calibration processing.
Figure 4B:
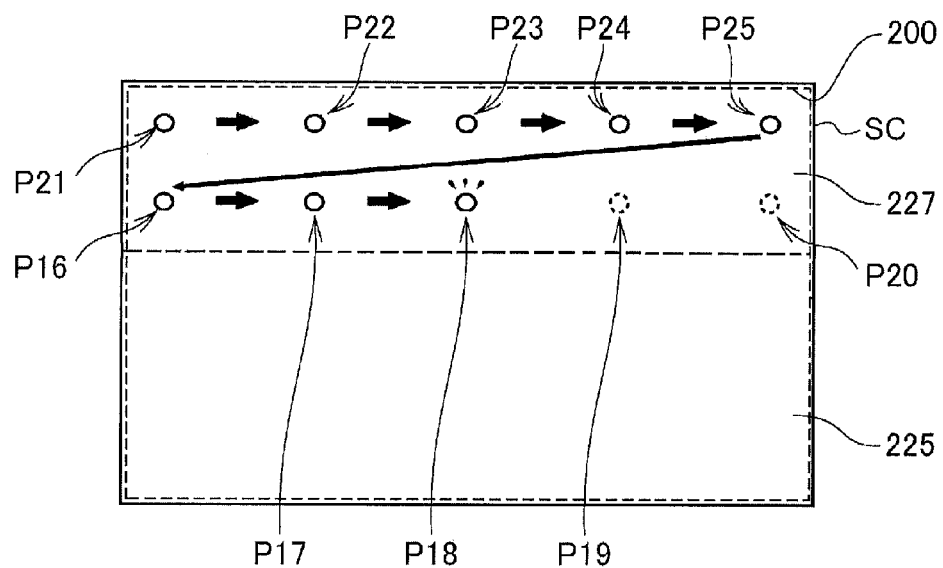

FIGS. 4A and 4B show another example of the target image 201 displayed by the calibration control unit 34 in the calibration processing. FIG. 4A shows the display mode and display order of the target image 201 in the lower part of the projection range 200. FIG. 4B shows the display mode and display order of the target image 201 in the upper part of the projection range 200.

In the example shown in FIGS. 4A and 4B, the projection range 200 is divided into two, upper and lower parts. The lower part is a rectangular area 225. The upper part is a rectangular area 227. The area 225 includes reference positions P1 to P15. The area 227 includes reference positions P16 to P25.

The calibration control unit 34, in the position acquisition process, causes the target image 201 to be displayed, starting at the area situated on the bottom side (here, the area 225), of the area set as the projection range 200. The display order of the target image 201 inside the area 225, that is, the display order of the reference positions P1 to P15 is arbitrary. For example, as shown in FIG. 4A, the target image 201 may be displayed, starting at the reference position P11 situated in an upper part inside the area 225.

After the operation with the indicator 70 is carried out at all of the reference positions P1 to P15 in the area 225, the calibration control unit 34 causes the target image 201 to be displayed at the reference positions P16 to P25 in the area 227 situated on the top side of the projection range 200. The display order of the target image 201 inside the area 227 is arbitrary.

Both while the target image 201 is displayed in the area 225 and while the target image 201 is displayed in the area 227, the calibration control unit 34 ends the position acquisition process if suspension of the calibration processing is indicated.

In the example shown in FIGS. 4A and 4B, too, the target image 201 is displayed, starting at the area situated on the bottom side, of the plural areas that are set in the projection range 200. Therefore, the effect of reducing the burden on the operator can be achieved.

It should be noted that the calibration control unit 34 can divide the projection range 200 into three or more areas and cause the target image 201 to be displayed, starting at the area on the bottom side. Each of the divided areas is not limited to rectangular.

Figure 5:
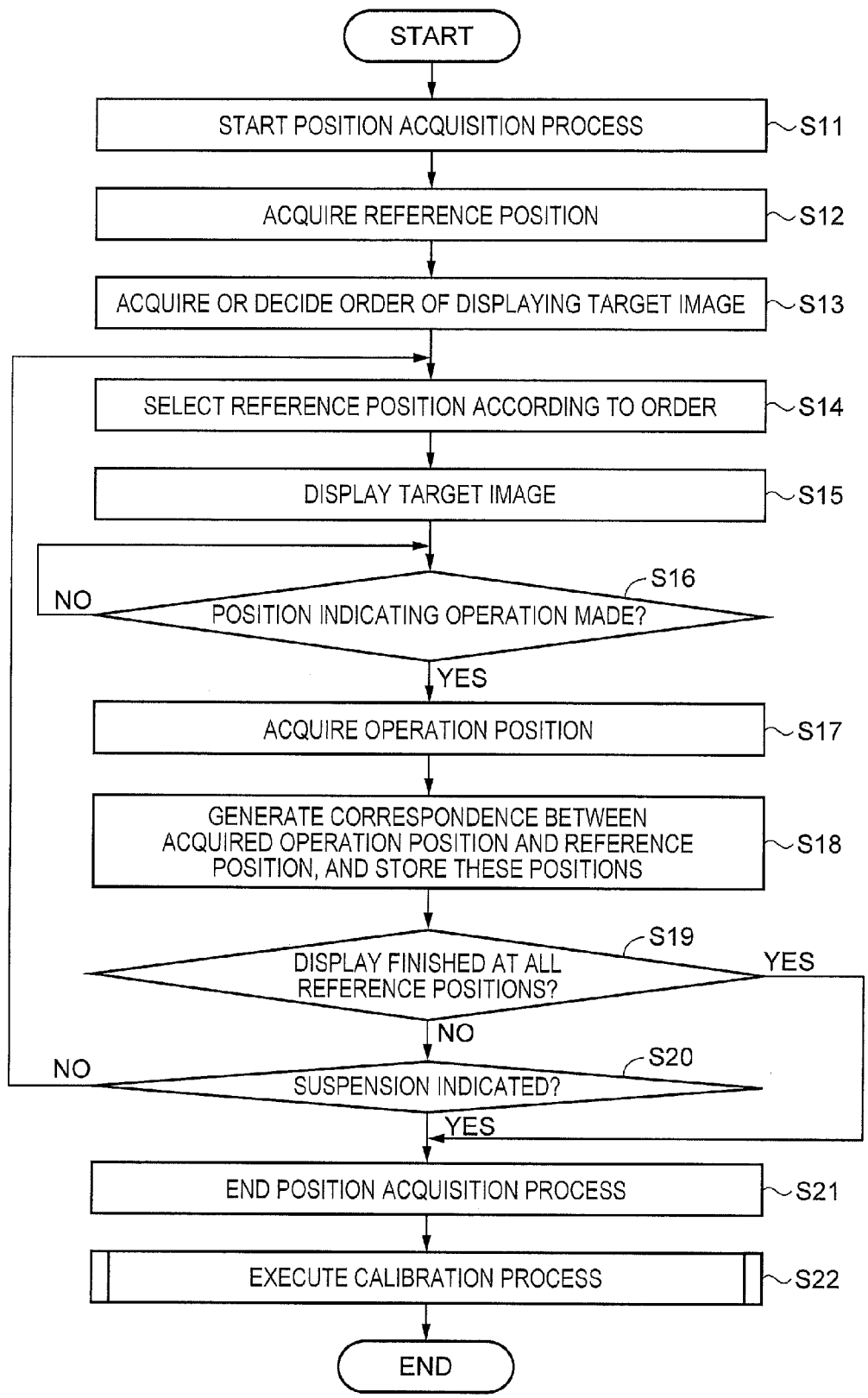
FIG. 5 is a flowchart showing an operation of the projection system.
Figure 6:
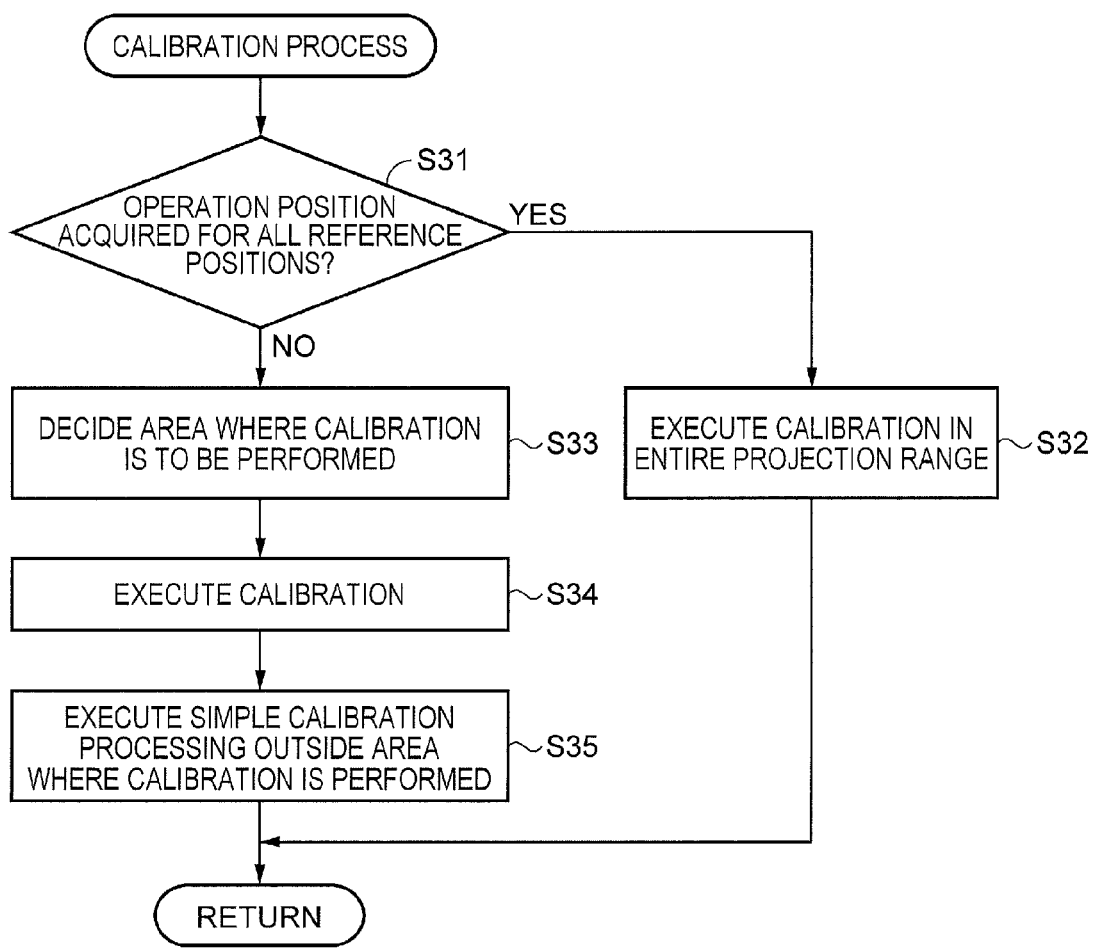
FIG. 6 is a flowchart showing an operation of the projection system.

FIGS. 5 and 6 are flowcharts showing the operation of the projection system 1. FIG. 5 shows the calibration processing of the projector 10. FIG. 6 shows step S22 of FIG. 5 in detail.

As the calibration processing starts, the calibration control unit 34 first starts the position acquisition process (step S11). The calibration control unit 34 acquires a reference position to display a target image, referring to the data stored in the storage unit 35 (step S12). Next, if data that defines the order of displaying the target image is stored in the storage unit 35 with respect to all of the acquired reference positions, the calibration control unit 34 acquires this display order (step S13). Here, if data that defines the order of displaying the target image is not stored in the storage unit 35, the calibration control unit 34 decides the display order. Consequently, in step S13, the order is decided in such a way that the target image is displayed, starting at the reference position situated on the bottom side of the projection range.

The calibration control unit 34 selects one reference position at which the target image is to be displayed, according to the order decided in step S13 (step S14). In this embodiment, since target images are displayed one by one, one reference position is selected in step S14. However, it is possible to display the target image at plural reference positions at the same time, and in such a case, plural reference positions are selected in step S14. For example, two target images may be displayed each time and the position indicating operation may be carried out to the two target images.

The calibration control unit 34 causes the target image to be displayed at the reference position selected in step S14 (step S15). Subsequently, the calibration control unit 34 waits until the position detection unit 50 detects a position indicating operation with the indicator 70 (step S16). If a position indicating operation is detected (step S16, Yes), the calibration control unit 34 acquires the operation position found by the position detection unit 50 (step S17). The calibration control unit 34 generates the correspondence between the acquired operation position and the reference position displayed at the time of the operation, that is, the reference position where the target image is displayed in step S15, and stores these positions (step S18). In step S18, the operation position and the reference position may be temporarily stored in the RAM forming the control unit 30 or stored in the storage unit 35. Also, if the target image is displayed at plural reference positions in step S15, the calibration control unit 34 generates the correspondence between each of the plural operation positions detected by the position detection unit 50 and the reference position, and stores these positions.

The calibration control unit 34 determines whether processing to display the target image is carried out in steps S14 to S15 with respect to all of the reference positions acquired in step S12 or not (step S19). If there is a reference position where the target image is not displayed yet (step S19, No), the calibration control unit 34 determines whether suspension of the calibration processing is indicated or not (step S20). If suspension of the calibration processing is not indicated (step S20, No), the calibration control unit 34 returns to step S14 and selects the next reference position.

If suspension of the calibration processing is indicated (step S20, Yes), the calibration control unit 34 ends the position acquisition process (step S21). Also, if processing to display the target image is carried out at all the reference positions acquired in step S12 (step S19, Yes), the calibration control unit 34 shifts to step S21 and ends the position acquisition process. Subsequently, the calibration control unit 34 executes the calibration process based on the operation position acquired in the position acquisition process (step S22), and then ends the calibration process.

Details of the calibration process in step S22 are shown in FIG. 6.

The calibration control unit 34 determines whether the operation position is already acquired with respect to all of the reference positions acquired in step S12 (FIG. 5) or not (step S31). If the operation position is already acquired with respect to all of the reference positions (step S31, Yes), the calibration control unit 34 executes calibration of the entire projection range based on the acquired operation position (step S32) and then ends the calibration process.

If the operation position is not acquired yet with respect to all of the reference positions, that is, if the operation position is not acquired with respect to a part of the reference positions (step S31, No), the calibration control unit 34 decides an area where calibration is to be performed (step S33). This area is a part of the projection range. The calibration control unit 34 performs calibration in the decided area (step S34) and subsequently executes the foregoing simple calibration with respect to the section outside the area that is decided in step S33 (step S35).

As described above, the projector 10 according to the embodiment to which the invention is applied includes the projection unit 20, the position detection unit 50, and the calibration control unit 34. The projection unit 20 projects an image on the screen SC. The position detection unit 50 detects an indicating operation to the screen SC. The calibration control unit 34 causes the projection unit 20 to project a target image at a reference position inside the projection range of the projection unit 20, acquires the operation position for the indicating operation detected by the position detection unit 50 during the projection of the target image, and carries out calibration processing. The calibration control unit 34 causes the target image to be projected, starting at a reference position situated in a lower part of the projection range, of plural reference positions within the projection range.

According to this configuration, the target image is projected, starting at the bottom side within the projection range. On the bottom side of the projection range, the operator can easily carry out the indicating operation in most cases. Therefore, projecting the target image first at the position where the operator can easily carry out the indicating operation can reduce the burden of the operation.

The calibration control unit 34 causes the target image to be projected sequentially from bottom to top with respect to plural reference positions arranged in advance in the projection range, for example, as shown in FIGS. 3A and 3B. In this case, since the position operated by the operator moves from bottom to top, the operator can easily carry out the indicating operation. Also, in the case of suspending processing before the target image is projected at all of the reference positions, since the target image is projected sequentially, starting at the reference position where the operation can be carried out easily, the indicating operation can be carried out at many reference positions and therefore more appropriate calibration can be performed.

Also, the calibration control unit 34 causes a target image to be projected at a reference position within a predetermined area that is set to include a lower part of the projection range 200 and then acquires an operation position, as in the area 225 shown in FIG. 4A, and subsequently causes the target image to be projected at a reference position outside the predetermined area. In this case, the target image can be projected, starting at the reference position where the operation can be carried out easily, and the projection order of the target image at reference positions within the predetermined area can be changed arbitrarily. Therefore, the operation in calibration is made easier and the target image can be projected in the order suitable for the calibration processing.

The calibration control unit 34 executes the position acquisition process in which a target image is projected at a reference position to acquire an operation position, and the calibration process in which calibration is executed based on the operation position acquired in the position acquisition process. In the position acquisition process, if suspension of the processing is indicated after the operation position is acquired with respect to a part of plural reference positions, the calibration control unit 34 ends the position acquisition process and carries out the calibration process. Therefore, after the target image is projected, starting at the reference position in the lower part of the projection range, the processing can be suspended and calibration can be executed at the point when the indicating operation is carried out only for the reference position within the range in which the operator can operate. Therefore, calibration can be carried out even if the operator does not carry out the indicating operation to the upper part of the projection range. This can further reduce the burden of the operation.

Moreover, if suspension of the processing is not indicated in the position acquisition process, the calibration control unit 34 acquires the operation position with respect to all of the plural reference positions that are preset in the projection range and subsequently executes the calibration process. In this case, more appropriate calibration can be performed, based on many reference positions and operation positions. Also, if reference positions are set in the entire projection range, calibration can be performed to the entire projection range, and the operation position can be accurately detected when the indicating operation to the screen SC is carried out.

Also, if the indicating operation with the indicator 70 detected by the position detection unit 50 in the position acquisition process is an operation that meets a preset condition, the calibration control unit 34 detects an indication of suspension of the processing. Therefore, the operator can indicate suspension of the processing by using the indicator 70 without having to replace the device used for the operation or to operate a remotely located switch or the like. This can further reduce the burden of the operation.

Also, if an indication of suspension of the processing is inputted via the remote controller or the operation panel 19 in the position acquisition process, the calibration control unit 34 ends the position acquisition process and executes the calibration process. Therefore, the indication of suspension of the processing can be detected securely and quickly.

The above embodiment is only a specific example of mode to which the invention is applied. The embodiment does not limit the invention and the invention can be applied in different modes from the embodiment. While the configuration in which the calibration control unit 34 arranges and displays a target image at a reference position is described as an example in the embodiment, the invention is not limited to this configuration. For example, an image which has substantially the same size as the entire projection range and in which a target image is arranged at a reference position, may be prepared for each reference position and stored in the storage unit 35. In this case, the calibration control unit 34 can read out the image corresponding to a selected reference position and cause this image to be projected, thus displaying the target image at an arbitrary reference position. Moreover, the calibration control unit 34 may have the function of outputting, to the PC 100, the result of generating the correspondence between the position on the projection image data and the position on the screen SC by the calibration processing.

While the position detection unit 50 causes the image pickup unit 51 to pick up the screen SC and specifies the position of the indicator 70 in the embodiment, the invention is not limited to this configuration. For example, a method in which electromagnetic waves such as ultrasonic waves are emitted from the indicator 70 and received at plural sites on the screen SC to specify the position of the indicator 70 may be employed. Also, the image pickup unit 51 is not limited to the configuration that faces the same direction as the projection system 23 and picks up an image of the screen SC from above. The image pickup unit 51 may be arranged as a separate unit from the main body of the projector 10, or the image pickup unit 51 may pick up an image from the lateral side or front of the screen SC. Moreover, plural image pickup units 51 may be arranged, and the detection control unit 32 may detect the position of the indicator 70, based on the pickup image data from the plural image pickup units 51.

While an indicating operation with the indicator 70 is described as an example in the embodiment, the invention is not limited to this configuration. The indicator to carry out an indicating operation with is not limited to the indicator 70 having the operation switch 72 and may be anything that can indicate a position on the screen SC. For example, the operator's hand or finger may be used. Also, devices such as laser pointer and indicating rod, for example, may be used.

In the embodiment, a configuration using three transmission-type liquid crystal panels corresponding to the respective colors of RGB is described as an example of the light modulator 22 that modulates light emitted from the light source. However, the invention is not limited to this configuration. For example, a configuration using three reflection-type liquid crystal panels, or a combination of a liquid crystal panel and a color wheel may also be employed. Alternatively, a method using three digital mirror devices (DMDs), a DMD method with a combination of a digital mirror device and a color wheel, or the like may be employed. If only a single liquid crystal panel or DMD is used as the light modulator, members equivalent to a combining system, such as cross dichroic prism, are not necessary. Moreover, other than liquid crystal panels and DMDs, any light modulator capable of modulating light emitted from the light source can be employed without problems.

Each functional part of the projection system 1 shown in FIG. 2 represents the functional configuration and the specific form of installation thereof is not limited. That is, there is no need to install hardware that individually corresponds to each functional part. As a matter of course, a processor can execute programs to realize the functions of plural functional parts. Also, a part of the functions realized by software in the embodiment may be realized by hardware, whereas apart of the functions realized by hardware may be realized by software. Additionally, the specific detailed configuration of each of the other parts of the projection system 1 can be arbitrarily changed without departing from the scope of the invention.

What is claimed is:

1. A projector comprising:
a projection unit which projects an image on a projection surface;
an operation detection unit which detects an indicating operation to the projection surface; and
a control unit which:
causes the projection unit to project a target image at one of a plurality of reference positions that are preset within a projection range of the projection unit, starting at a reference position located in a lower part of the projection range,
acquires a first operation position with respect to one of the plurality of reference positions for the indicating operation detected by the operation detection unit during the projection of the target image,
when suspension of processing is indicated after the first operation position is acquired:
stops acquiring operation positions with respect to the plurality of reference positions, and
decides an area where calibration processing is to be carried out based on the acquired operation positions,
when suspension of processing is not indicated, acquires operation positions for a remainder of the plurality of reference positions, and
after acquiring operation positions is stopped or completed, carries out calibration processing based on the acquired operation positions.

2. The projector according to claim 1, wherein the control unit detects an indication of suspension of processing when the indicating operation detected by the operation detection unit during operation position acquisition is an operation that meets a preset condition.

3. The projector according to claim 1, further comprising an input unit,
wherein the control unit ends operation position acquisition and executes calibration, when an indication of suspension of processing is inputted by the input unit during operation position acquisition.

4. The projector according to claim 1, wherein the control unit causes the target image to be projected sequentially from bottom to top with respect to the plurality of reference positions arranged in advance in the projection range.

5. The projector according to claim 1, wherein a predetermined area including the lower part of the projection range is set, and
the control unit causes the target image to be projected at the reference position within the predetermined area, acquires the operation position, and subsequently causes the target image to be projected at a reference position outside the predetermined area.

6. The projector according to claim 1, wherein the starting reference position is a same distance or closer to a bottom of the projection range than all other reference positions.

7. A projector control method comprising:
controlling a projector which projects an image on a projection surface;
projecting a target image at one of a plurality of reference positions that are preset within a projection range on the projection surface, starting at a reference position located in a lower part of the projection range;
detecting an indicating operation to the projection surface during the projection of the target image;
acquiring a first operation position with respect to one of the plurality of reference positions for the detected indicating operation;
when suspension of processing is indicated after the first operation position is acquired:
stopping acquiring operation positions with respect to the plurality of reference positions; and
deciding an area where calibration processing is to be carried out based on the acquired operation positions;
when suspension of processing is not indicated, acquiring operation positions for a remainder of the plurality of reference positions; and
after acquiring operation positions is stopped or completed, carrying out calibration processing based on the acquired operation positions.

8. A projector comprising:
a projection unit which projects an image on a projection surface;
an operation detection unit which detects an indicating operation to the projection surface; and
a control unit which:
causes the projection unit to project a target image at one of a plurality of reference positions that are preset within a projection range of the projection unit, starting at a reference position located in a lower part of the projection range,
acquires a first operation position with respect to one of the plurality of reference positions for the indicating operation detected by the operation detection unit during the projection of the target image,
when suspension of processing is indicated after the first operation position is acquired:

stops acquiring operation positions with respect to the plurality of reference positions, and uses the acquired operation positions from the lower part of the projection range to carry out calibration processing for an upper part of the projection range outside of the lower part of the projection range, and when suspension of processing is not indicated:

acquires operation positions for a remainder of the plurality of reference positions, and after acquiring operation positions is completed, carries out calibration processing based on the acquired operation positions.

\* \* \* \* \*